Patented Aug. 23, 1932

1,872,912

UNITED STATES PATENT OFFICE

CAMILLE DREYFUS, OF NEW YORK, N. Y.

METHOD OF MAKING ARTICLES

No Drawing. Application filed October 4, 1929. Serial No. 397,453.

This invention relates to making articles of hollow shape from plastic compositions containing derivatives of cellulose.

An object of my invention is to prepare articles of hollow shape from thermoplastic compositions containing derivatives of cellulose. Other objects of my invention will appear from the following detailed description.

The making of hollow articles from plastic compositions containing organic derivatives of cellulose in an economical manner has presented serious difficulties. If attempts are made to blow such hollow in molds by air or steam that is introduced under pressure, satisfactory results are not obtained.

I have found that hollow articles may be made by placing a preformed closed hollow article made of a thermoplastic composition containing a derivative of cellulose and of simple construction within a mold of desired shape and configuration, and then heating the molds. Owing to the effect of the elevated temperatures resulting, the air or other gas confined within the hollow article expands and the plastic material softens, and the expanding air or gas forces the softened plastic material onto the walls of the mold. Since both the expansion of the air and the degree of softening of the plastic material are functions of the temperature, there is provided a sort of automatic control whereby the pressure of the air or gas varies with the degree of softness of the plastic material. In this manner, the danger of having too great an air pressure when the plastic material is not soft enough to yield to this pressure is avoided.

In accordance with my invention I prepare hollow articles made from thermoplastic compositions containing a derivative of cellulose and a plastifier by placing a hollow but entirely closed article within a mold of desired shape and having any desired ornamental surface and then heating. The heating causes the air or other gas within the hollow article to expand and also causes the thermoplastic material to soften and the softened material is forced against the walls of the mold, whereupon an article is formed conforming exactly to the shape and interior surface of the mold.

Any suitable thermoplastic composition containing a derivative of cellulose may be employed. I prefer to use organic derivatives of cellulose such as organic esters of cellulose or cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

The thermoplastic composition contains besides the derivatives of cellulose a suitable plastifier. Examples of such plasifiers or softening agents are dibutyl tartrate, diethyl tartrate, triacetin, diethyl phthalate, triphenyl phosphate, diphenylol propane, etc. The plastic composition should preferably contain a comparatively large proportion of a plastifier so that the composition is comparatively soft whereby upon heating it readily yields to the pressure of the gas contained within the hollow article. The plastic composition may contain pigments, dyes or other effect materials commonly employed in such compositions.

As a starting material, hollow articles made of thermoplastic material are used. I prefer to employ hollow articles that may be readily and cheaply made. The shape of such articles should preferably roughly correspond to that of the desired final product. Thus if dolls or other articles of elongated shape are to be made, I prefer to employ tubes, cylinders or prisms, whereas for articles simulating the shape of fruit or vegetables such as applies, oranges or pumpkins, I prefer to use spheres or balls as the starting material.

The tubes or cylinders employed as the starting material may be formed by extrusion through dies, or they may be formed by joining together two sheets that have been curved to correspond to semi-cylinders. Obviously the ends of the tubes or cylinders are sealed in appropriate manner in order to entirely confine the atmosphere within them.

The finished article need not be an entirely enclosed article, but the enclosed article taken from the mold may be cut into desired shape.

It will be seen that by my process hollow articles of thermoplastic compositions containing derivatives of cellulose may be made economically and expeditiously. Articles of any desired shape may be made in this manner and designs in relief or intaglio may be imparted to the surface thereof conforming to the design on the mold.

As an example, it may be pointed out that articles simulating the appearances of fruits or vegetables such as pumpkins, oranges or the like to be used as ornaments for decorating Christmas trees may be readily made by this invention. To do this, sheets of a thermoplastic material containing cellulose acetate and a relatively large proportion of a suitable plastifier, such as dibutyl tartrate or triacetin, are "shaped" by pressing in a suitable press into the form of hemispheres, and two hemispheres are joined by cementing to form a closed sphere that is air-tight This sphere is placed in a mold having the shape of the desired fruit and the mold is heated. The elevated temperature causes the air confined within the sphere to expand and the thermoplastic material composing the walls thereof to soften. The softened thermoplastic material is forced by the expanding air onto the walls of the mold. The mold is then cooled and opened, and the article is removed.

It is to be understood that the foregoing detailed description is given merely by way of illustration, and that many variations may be made therein without departing from the spirit of my invention.

Having described my invention, what I claim and desire to secure by Letters Patent is:

1. Method of making articles comprising inserting a closed hollow article made of a thermoplastic composition containing a derivative of cellulose within a closed mold and then raising the temperature, whereby the thermoplastic composition softens and the gas confined within the hollow article expands and forces the same against the walls of the mold.

2. Method of making articles comprising inserting a closed hollow article made of a thermoplastic composition containing an organic derivative of cellulose within a closed mold and then raising the temperature, whereby the thermoplastic composition softens and the gas confined within the hollow article expands and forces the same against the walls of the mold.

3. Method of making articles comprising inserting a closed hollow article made of a thermoplastic composition containing cellulose acetate within a closed mold and then raising the temperature, whereby the thermoplastic composition softens and the gas confined within the hollow article expands and forces the same against the walls of the mold.

In testimony whereof, I have hereunto subscribed my name.

CAMILLE DREYFUS.